United States Patent Office
3,585,006
Patented June 15, 1971

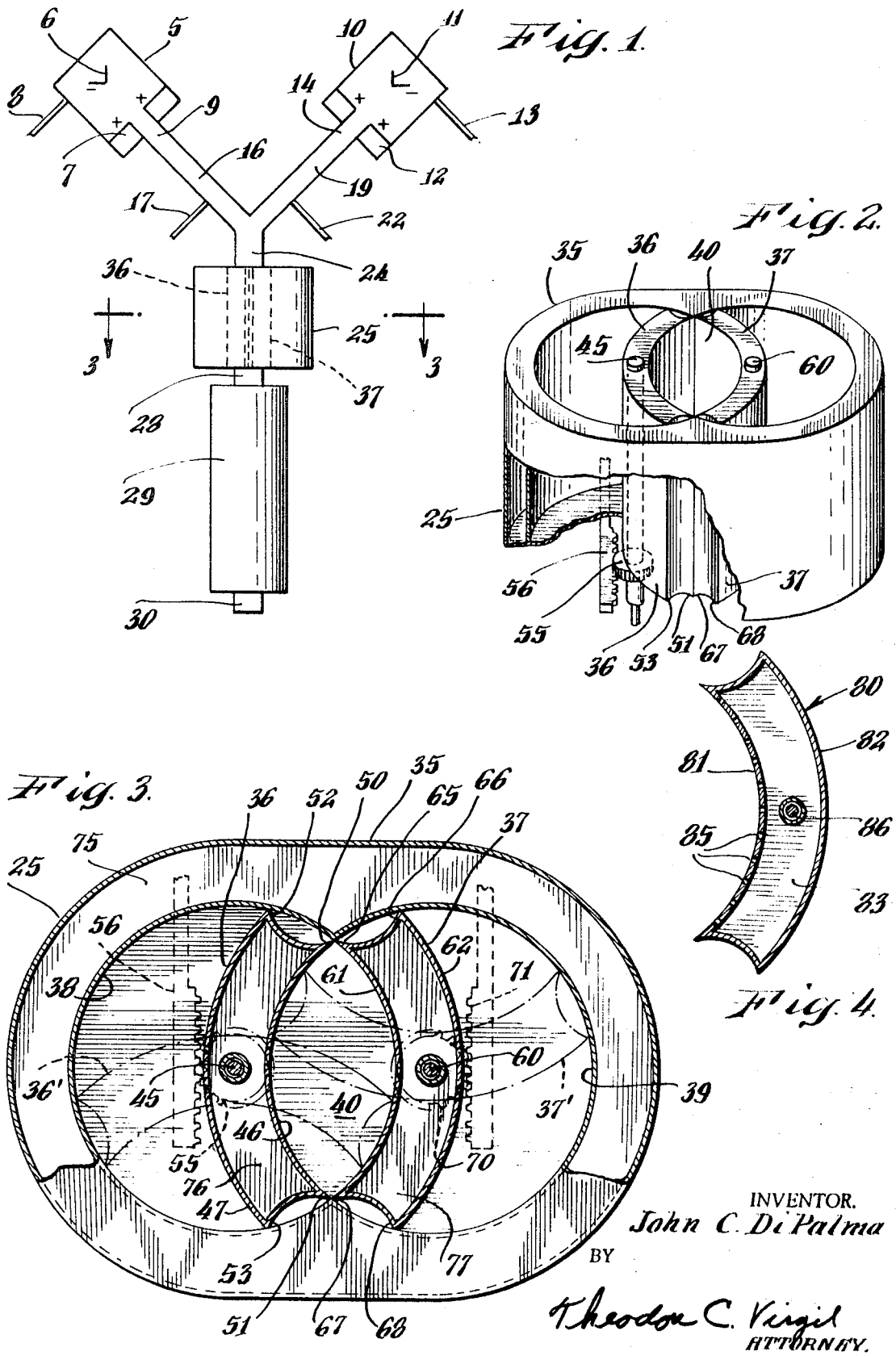

3,585,006
NON-PLUGGING REACTOR FOR TiO₂ PRODUCTION
John Candide Di Palma, Rowayton, Conn., assignor to American Cyanamid Company, Stamford, Conn.
Filed Nov. 6, 1968, Ser. No. 773,781
Int. Cl. B08b 9/08; C01g 23/04
U.S. Cl. 23—277
2 Claims

ABSTRACT OF THE DISCLOSURE

Apparatus is provided to prevent the plugging of a reactor used to prepare finely divided metal oxides, such as titanium dioxide, by reacting oxygen with a vaporous metal or metalloid salt. The reaction occurs in a reaction chamber having walls which are sectional and pivoted to rotate about a fixed axis, with the axis of rotation of one section at the center of curvature of the other. Rotation of one individual secion serves to clean the inner surface of another section and so prevent plugging of the reactor. Critical build-up of solid deposits in the reaction chamber is thereby avoided, permitting production of a high quality pigmentary product over long periods of time without interruption of operation. The apparatus is especially useful in the production of TiO₂ from TiCl₄ but it is also useful in the preparation of other refractory oxides.

BACKGROUND OF THE INVENTION

This invention relates generally to an improvement in high temperature processes for making particulate oxides of refractory metals and metalloids. More particularly, it relates to an improvement in the reactor structure for high-temperature processes for producing finely-divided titanium dioxide.

In the high-temperature plasma jet processes, oxide powders, particularly titanium dioxide, can be produced, without utilization of auxiilary burning gases and with reduced or minimal amounts of nucleating agents. In operation, a gas is passed through a high-energy electric arc and the resulting plasma (the term "plasma" being employed generally herein to designate a very hot, partially ionized gas stream) is contacted either with the material to be oxidized or the oxygen-containing stream or both. The plasma is thus the source of heat for raising the reactants to a temperature at which oxidation is initiated. No by-products of burning are introduced into the gas stream, and, thus, various problems which have been associated with the prior art methods are obviated.

The general procedure employed in utilizing the plasma jet involves heating a gas such as nitrogen, argon, air, oxygen, etc., by means of an arc discharge to form a plasma stream. The reactants are brought into intimate contact with the plasma stream or streams in a manner such that the desired exothermic oxidation reaction is initiated. The resultant oxide product is secured by quenching the reactor effluent and entrapping by conventional means the precipitated oxide powder. A description of one such plasma process for production of oxides is shown in Skrivan Pat. 3,275,412.

It has been discovered, however, that during the production of the finely divided solids, particularly in making titanium dioxide, the solid product tends to build up on the reactor wall. This effect occurs generally in various synthesis methods for making refractory oxides of metals and metalloids, and causes severe problems with both reactor efficiency and product quality.

Various methods have been tried to prevent this build-up of solid oxides on the reactor walls, since prevention of such build-up allows more continued operation of the unit with reduced "down time," and results in improved product quality. These methods have included the utilization of flexible reactor walls which walls are periodically flexed or pulsed to shake loose any build-up. They have also included the use of shock waves running in a direction counter to the current of material passing through the reactor, such as shown in Canadian Pat. 1,112,964. Another approach has been to utilize porous walls in the reaction chamber and to direct purging gas under pressure inwardly through the pores of the walls of the reaction zone.

SUMMARY OF THE INVENTION

This invention is directed to an apparatus for preventing plug formation within a reactor. Though applicable to various refractory oxides, it is principally directed to the production of TiO₂. The invention is here described, for convenience, in connection with the plasma jet process, but may also be used with other methods of heating the reactants.

The reactor is constructed of outer and inner walls. In its preferred form, the outer walls are generally elliptical in shape on the outside, and, on the inside, have a cross-sectional configuration of two overlapping circles. The inner walls are preferably formed of two cylindrical sections, each shaped like the arc of a circle with a radius the same as the circles of the outer walls, and being pivoted at an axis of rotation. The axis of rotation of one inner wall is at the center of curvature of the other. The pivoted wall sections thereby serve to complete the circles defined by the cross-section of the outer wall structure.

The reaction chamber is within the inner wall sections. Periodically, during the operation of the reactor, the wall sections are rotated, one at a time, about their pivots. This rotation causes the edge of one wall section to rub against or scrape the inner surface of the opposite wall section, thus, cleaning it of any deposited material. This is followed by corresponding rotation of the other wall section.

The reactor is self-cleaning, and utilizes no external cleaning device. Introduction of impurities from the outside of the device is avoided; and the unit does not have to be shut down to clean the reactor. In addition, if desired, the internal walls of the reactor may be porous to allow the passage into the reaction zone of a purging gas to give greater cleaning effect.

DESCRIPTION OF THE DRAWINGS

The drawings show:

FIG. 1 is a schematic drawing of a typical plasma jet generator using the reaction chamber of my invention.

FIG. 2 is a perspective view of a portion of the reaction chamber, separated from the plasma generator itself. The lower portion of the figure is partially broken away.

FIG. 3 is a section, taken on line 3—3 of FIG. 1, showing the internal construction of the reaction chamber. Displaced positions of the inner reactor walls are shown in dotted outline.

FIG. 4 shows one of the internal walls modified to allow passage of air through that wall for additional purging effect.

DETAILED DESCRIPTION OF THE INVENTION

In using a plasma jet, a gas such as nitrogen, argon, air, oxygen, etc., is heated by means of an arc discharge to form a plasma stream. The reactants are brought either serially or simultaneously into intimate contact with the plasma stream in a manner such that adequate heat is provided and the desired oxidation reaction is initiated. The resultant oxide product is secured by quenching the reactor effluent and collecting the precipitated oxide powder by conventional means.

A feature of this method is that it is useful for the production of any kind of refractory metal or metalloid oxide or mixtures of such oxides. The oxidizable starting material can be any inorganic metal or metalloid salt such as a halide (for example, a chloride or bromide) or an oxyhalide (for example, the oxychloride). The metal or metalloid salts which can be converted are exemplified by silicon, titanium, aluminum, zirconium, boron and antimony compounds. It is feasible to use mixtures of such salts. The most important of the oxidizable compounds which can be converted by the plasma jet oxidation process are zirconium tetrahalide, silicon tetrahalide, and titanium tetrahalide. These materials give oxide powders used in pigment, catalyst, rubber and paper applications. Aluminum oxides suitable for gem manufacture may also be produced by oxidation of the corresponding aluminum salt.

The fluid used to form the plasma may be any gaseous material such as nitrogen, air, oxygen, argon, or helium. It is preferable that air or oxygen not be used to heat the metal or metalloid salt. However, it is satisfactory to use air or oxygen to form the plasma used in heating the oxidizing gas.

Generally, the plasma should be heated to a temperature of about 3,000° C. to 12,000° C. prior to being mixed with the reactant. The quantity of reactant salt or salts mixed with a given amount of plasma depends, of course, on the desired reaction temperature and heat losses expected to occur before the reactants are mixed. In most operations, the quantity of plasma will be about 3–95% of the total gas mixture and preferably about 5–45% of the volume of the gas. The total volume of gases should be such that reactant streams flow together with turbulent mixing.

The gas used to form the plasma may, if desired, be preheated by any practical means before being fed into the plasma generator; and the individual reactants may be preheated by such means as recycle of reaction zone effluents. Normally, such conventional heat exchange methods will raise either the reactants or the plasma-forming gas to temperatures up to 600° C.

The temperature at which the oxidation reaction is initiated will, of course, depend upon the particular salt which is being oxidized. Initiation temperatures are well-known for such salts as the halides of aluminum, silicon, titanium, antimony and boron. The actual temperature to which the reactants are raised may be above the initiation temperatures in order to hasten the rate of reaction and to reflect particle size requirements. In general, the reaction mixture should remain in the zone of reaction for a period of at least 0.001 second and, practically speaking, the residence need not be longer than one second. More usually, a residence of about 0.02 to .1 second is adequate and will give the product in the desired particle size.

In the case of titanium dioxide where it may be desired to enhance the yield of the rutile crystalline form as against the anatase form, a small amount of aluminum chloride may be fed into the reaction zone, as, for example, by mixture with the titanium tetrachloride reactant stream. The amount of aluminum chloride used for this purpose may vary over a wide range. In general, about 0.2 to 6.0% or, more preferably, 0.4 to 2.5% by weight of the product oxide should be employed. Titanium dioxide produced by this method (with or without aluminum chloride) is found to have a large proportion of particles in the optimum size range of 0.17 to 0.22 micron.

The amount of oxygen used will, in the first instance, depend upon the stoichiometry of the reaction. For practical results, at least a stoichiometric amount should be used based upon the salt to be oxidized. It is normally desirable to have an excess of oxygen available for reaction. This excess can, without practical inconvenience, be as high as 100% by volume, or even higher. More usually, a 5–50% by volume excess of oxygen is employed with good results.

One type of generator and reactor is shown in FIG. 1. A plasma jet generator 5 of conventional design is provided with a negative electrode 6 and an annular positive electrode 7. An arc is struck between the two electrodes. Nitrogen is fed to the generator 5 by means of a line 8, and it passes by electrode 6 and flows through electrode 7 to an exit point 9. The nitrogen stream stabilizes the arc and, in turn, the arc heats the nitrogen to the desired temperature. A second plasma jet generator 10 also contains a negative electrode 11 and an annular positive electrode 12, and an arc is struck between them. Nitrogen, fed to the generator 10 by means of line 13, passes within the generator between the positive and negative electrodes 11 and 12, stabilizing the electric arc and, in turn, being heated by it. The nitrogen leaves the generator 10 at exit point 14.

The nitrogen is discharged from generator 5 into a ½" D. x 2" pipe 16. About one inch from the discharge point 9 of generator 5, oxygen is fed to pipe 16 by means of line 17. Generator 10 likewise discharges preheated nitrogen into another ½" D. x 2" pipe 19. At a distance of about one inch from the discharge point 14, $TiCl_4$ is fed into pipe 19 by means of line 22. Pipes 16 and 19 form an angle which, as shown in the drawing, is 90°. These dimensions are, of course, by way of example and may be varied under particular circumstances.

The reactant-containing nitrogen streams, flowing in pipes 16 and 19, converge and flow into conduit 24 which serves as a mixing zone. Immediately below conduit 24 is reactor 25. Reactor 25 is connected through conduit 28 to a water-cooled heat exchanger 29. The heat exchanger 29 is a pipe 6" in diameter and 6' long fitted with an exit pipe 30.

Referring now to FIG. 2, reactor 25 is made up of external wall or cover 35 and inner reactor walls 36 and 37. Walls 36 and 37 define a reaction chamber 40.

The outer reactor wall 35 has an internal configuration that preferably has a cross-section defined by two intersecting circles. Thus, as shown in FIG. 3, one of those circles would be indicated by the inner wall surface 38 of outer wall 35, and the other by inner wall surface 39 (on the left and right sides, respectively, as viewed in FIG. 3).

The inner structure of the reactor, made up of walls 36 and 37, defining the reaction chamber 40, is shown in FIGS. 2 and 3. Walls 36 and 37 are segments of cylinders, and symmetrical, but mirror images. Taking wall 36 as illustrative, it can be seen that the wall has a cross-section like the one of a circle with a radious of curvature the same as for inner surface 39. Wall 36 is pivoted at its mid-point 45, the pivot being the axis of rotation of the inner surface of internal wall 37.

Wall 36 has internal surface 46 and external surface 47, each of the surfaces preferably extending to the point of contact with surface 38. Thus, surface 46 approaches or contacts wall 38 at points 50 and 51, and outer surface 47 approaches or contacts wall 38 at points 52 and 53. Wall 36 may contact surface 38 throughout the entire width of wall 36, but preferably touches wall 38 only at the outer edges of wall 36, identified by the points 50, 51, 52, 53. This edge contact prevents material which may collect on surface 38 from getting wedged between wall 36 and surface 38 and so making the rotation of wall 36 about its pivot 45 more difficult.

Associated with pivot 45 is a rack and pinion structure to rotate the wall 36. Pinion 55 is secured to pivot 45, below wall 36 as shown on FIG. 3. Associated with pinion 55 is rack 56. Movement of rack 56 will turn pinion 55 and so rotate wall 36.

As mentioned previously, inner wall 37 is the mirror image of inner wall 36 and similar to it in operation. It is pivoted on pivot 60, located at the center of axis of surface 39, and has inner surface 61 and outer surface 62. These surfaces extend to the surface 39 at points 65, 66, 67 and 68. Wall 37 may be rotated by action of pinion 70 attached to pivot 60 and associated with rack 71.

The walls 36 and 37 may be any material, such as nickel, nickel alloy, or alumina compositions, which will resist reaction conditions. It will be seen that the inner surfaces 46 and 61 of inner walls 36 and 37, respectively, together define the inner reaction zone 40. The reactants, above referred to, are led by conduit 24 to this reaction zone 40, and the reaction takes place within zone 40.

The reaction of two gaseous components to produce a solid product such as titanium dioxide will normally, in a process such as this, result in a certain amount of deposition of the product on the reaction chamber walls, in this instance walls 46 and 61. If this is not prevented, it will in due course, plug the reactor and affect the quality of the resulting product.

By using the apparatus of my invention, however, the reactor may be simply and regularly cleaned. This is done by rotating walls 36 and 37, which form the reaction zone, one at a time. Such rotation causes the edges of the respective walls to scrape and so clean the inner surface of the other wall. Thus, when wall 36 is rotated about pivot 45, by action of the rack and pinion unit 55 and 56, the edge will scrape surface 61 of wall 37. If wall 36 is rotated clockwise, edges 50 and 52 will scrape surface 61; if counter-clockwise, edges 51 and 53 will do the cleaning.

Similarly, with wall 36 returned to its initial position, rotation of wall 37 counter-clockwise will cause edges 65 and 66 to scape the inner surface 46 of wall 36. Rotation clockwise will cause edges 67 and 68 to do the scraping.

To clarify the explanation, wall 36 has been shown in dotted configuration 36' in a partially rotated position, and pressing against the inner surface 61 of walls 37. Likewise, wall 37 is shown in dotted configuration 37' in partially rotated position scraping the inner surface 46 of wall 36. This rotation is one wall at a time. After cleaning, the walls are returned to their original positions.

It will be noted that this cleaning has been accomplished without opening reactor 25 as a whole. Normally the reaction would be stopped momentarily for this cleaning step, but, if desired, the unit may be cleaned by this method during reaction. Either way, downtime of the reactor is reduced to a minimum.

Reaction chambers for plasma jet reactors often include cooling jackets. In this instance the outer walls of reactor 25 may be hollow having a space therein 75 for the carrying of whatever fluid for cooling purposes is desired. Or, walls 36 and 37, defining the actual reaction chamber 40, may be hollow having the internal cooling fluid spaces 76 and 77, defined by surfaces 46 and 47 and surfaces 61 and 62, respectively. Fluid may be introduced in these cooling areas by any known means, not shown, but, preferably, walls 36 and 37 will have the fluid introduced axially about the pivots 45 and 60 so, as to allow for free rotation of those pivots.

FIG. 4 shows a modification of my invention as it would apply to the internal walls 36 and/or 37. There, a wall 80 of a type to be substituted for walls 36 and 37 is shown. It has an internal surface 81 and external surface 82 which together define internal space 83. Wall 81 is made of a porous or perforated material and has openings indicated generally by the numeral 85. These openings may be of any desired size.

Gas under pressure is introduced into space 83 through coaxial inlet 86 and passes through openings 85 into the reaction chamber 40. This gas may serve the purpose of isolating the reactants from the wall to minimize deposition of solid particles on the walls and may also be used as one step toward purging the walls of deposited products. If desired, both purging gas and a cooling fluid, isolated from one another, may be carried in the walls.

My invention has been shown designed with two movable walls 36 and 37. It would be within the spirit of the invention to design the structure with other combinations of walls adapted to accomplish a similar cleaning function. This function could also be accomplished by the use of circular or non-circular walls with movable axis of rotation, or by the use of non-circular walls whose dimensions can be changed while the walls are moving. Modifications such as these are deemed to be within the spirit of my invention. In addition, many other preheating and mixing configurations could be used upstream of reactor 25.

It is claimed:

1. In an apparatus for preparing finely divided refractory oxides by combining heated streams of reactant materials, that improvement including a reactor formed of two cylindrical walls having an internal surface having a cross-section shaped like the arc of a circle, said walls touching along their edges to form a reaction chamber with an inlet and an outlet, each of said walls being pivoted at their respective centers and at the axis of rotation of the other of said walls for rotary motion thereabout, and means for separately rotating said walls so the edges of each of said walls will scrape deposits off the inner surface of the other said wall said means including a rack and pinion associated with each said pivot.

2. Apparatus as set forth in claim 1 wherein said walls are hollow and the internal surfaces of said walls have openings therein, and means are provided for directing a gas under pressure into said falls so said gas may pass through said openings of said walls to aid in removing deposits therefrom.

References Cited

UNITED STATES PATENTS

| | | | |
|---|---|---|---|
| 2,238,864 | 4/1941 | Pratt et al. | 259—5 |
| 2,672,404 | 3/1954 | Schultz | 23—252 |
| 3,203,763 | 8/1965 | Kruse | 23—277X |
| 3,328,126 | 6/1967 | Stefano et al. | 23—277X |

JAMES H. TAYMAN, JR., Primary Examiner

U.S. Cl. X.R.

15—104.5; 23—284, 202, 252; 165—92, 94; 259—15

UNITED STATES PATENT OFFICE
CERTIFICATE OF CORRECTION

Patent No.  3,585,006           Dated  June 15, 1971

Inventor(s)   John Candide DiPalma

It is certified that error appears in the above-identified patent and that said Letters Patent are hereby corrected as shown below:

Column 1, line 18, after the word individual "secion" should read -- section --

Column 1, line 39, after the word of "auxiilary" should read -- auxiliary --

Column 4, line 47, after the word a "radious" should read -- radius --

Column 6, line 43, after the word said "falls" should read -- walls --

Signed and sealed this 27th day of February 1973.

(SEAL)
Attest:

EDWARD M. FLETCHER, JR.                ROBERT GOTTSCHALK
Attesting Officer                      Commissioner of Patents (Room 519)